United States Patent

Herriott et al.

[15] 3,677,651
[45] July 18, 1972

[54] FOCUS AND MAGNIFICATION ADJUSTMENT OF A HIGH-PERFORMANCE CAMERA

[72] Inventors: Donald Richard Herriott, Morris Township, Morris County; Eric Gordon Rawson, Murray Hill, both of N.J.

[73] Assignee: Bell Telephone Laboratories, Incorporated, Murray Hill, N.J.

[22] Filed: Sept. 29, 1970

[21] Appl. No.: 76,549

[52] U.S. Cl. ................................ 356/126, 356/6, 356/20, 356/247
[51] Int. Cl. ............................................. G01b 9/00
[58] Field of Search .................... 356/3, 6, 20, 124–126, 356/247

[56] References Cited

UNITED STATES PATENTS

| | | | |
|---|---|---|---|
| 1,532,879 | 4/1925 | Bugbee | 356/125 |
| 2,341,410 | 2/1944 | Mihalyi | 356/8 X |
| 2,881,686 | 4/1959 | Ruhle | 356/8 X |
| 3,003,407 | 10/1961 | Grey | 356/8 X |
| 3,139,016 | 6/1964 | Lange | 356/3 X |

FOREIGN PATENTS OR APPLICATIONS

| | | | |
|---|---|---|---|
| 223,839 | 3/1962 | Austria | 356/3 |
| 1,135,681 | 8/1962 | Germany | 356/124 |
| 440,614 | 10/1948 | Italy | 356/3 |

*Primary Examiner*—Ronald L. Wibert
*Assistant Examiner*—Edward S. Bauer
*Attorney*—R. J. Guenther and Arthur J. Torsiglieri

[57] ABSTRACT

A method and apparatus are disclosed for adjusting the location of the image and object planes of a camera to minimize focus and magnification errors. A special test reticle is used comprised of at least one, and preferably nine, test patterns on one side of the reticle. Over each pattern a first prism is mounted to tilt the apparent plane of the test pattern as seen in the prism and a second prism is ordinarily mounted to the other side of the reticle to compensate for the refraction due to the first prism. In use, the test reticle is placed in the object plane of the camera and a test image plate is exposed and developed. The sharpest points in the image of each of the tilted test patterns as well as the spacing between certain fiducial marks are then measured. From this data are derived the corrections that should be made in the positions of the object and image planes. With six to eight iterations of this procedure, good adjustment of the camera is achieved.

9 Claims, 4 Drawing Figures

MICROFLAT PHOTOGRAPHIC PLATE 31 WITH RESOLUTION TEST PATTERN AND FIDUCIAL MARKS

PRISMS 35 TO TILT APPARENT PLANE OF TEST PATTERN

PRISMS 36 ON BACKFACE TO COMPENSATE FOR REFRACTION OF ILLUMINATION BEAM

STAND-OFF PADS 39 TO MAKE TILTED OBJECT SURFACES STRADDLE CAMERA'S OBJECT PLANE

INVENTORS: D. R. HERRIOTT
E. G. RAWSON

BY: *Francis E Morris*

ATTORNEY

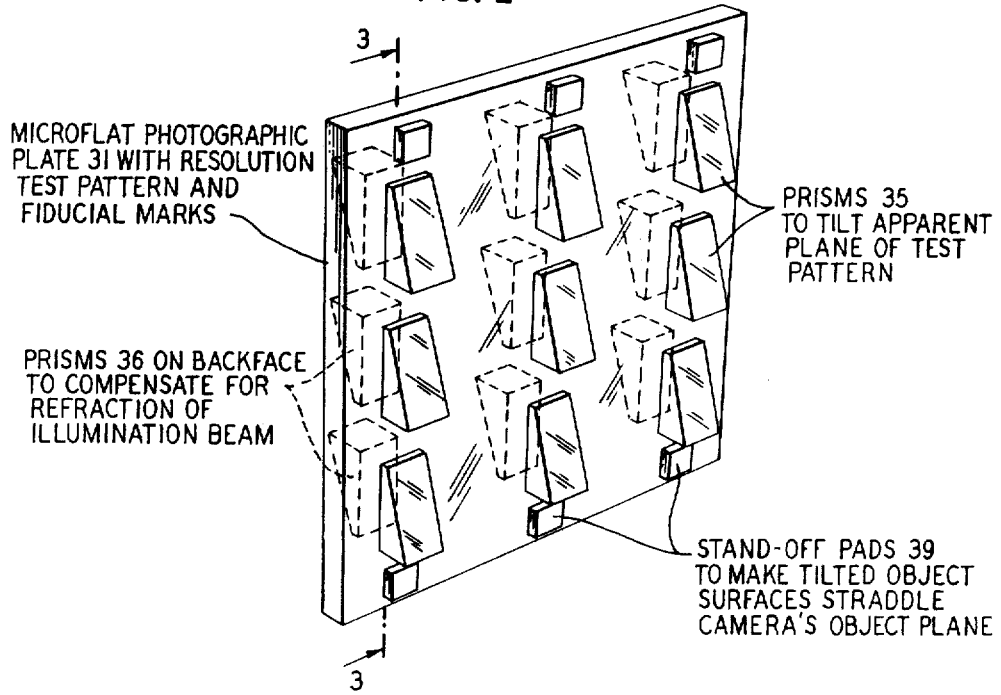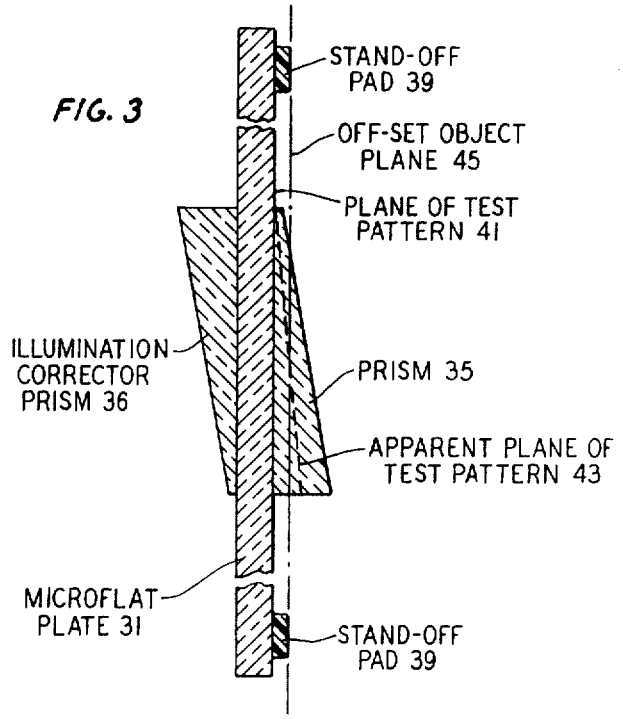

FOCUS AND MAGNIFICATION ADJUSTMENT OF A HIGH-PERFORMANCE CAMERA

BACKGROUND OF THE INVENTION

This concerns a method and apparatus for adjusting a camera. In particular it concerns a method and apparatus for adjusting the location of the object and image planes of a high-performance camera to minimize focus and magnification errors.

High-performance cameras are used today primarily in making the photolithography masks used in the fabrication of semiconductor devices, such as integrated circuits. As is well known, these masks are made by plotting the features of the mask on a transparency, reducing the size of the transparency, and forming a mask from the reduced-size image of the transparency. In a recently developed system, the transparency contains a 17.5 centimeter square area of interest and is reduced by a factor of 3.5 to a 5 centimeter square image. The mask is formed by exposing a photographic emulsion to this image. At present the camera must resolve 10 micron wide circuit elements throughout this 5 centimeter square image field and must have magnification errors that everywhere are less than one part in ten thousand. With these requirements, and with the requirements that are expected for the next few years, it is apparent that traditional methods of focus and magnification adjustment are impractically slow and difficult.

SUMMARY OF THE INVENTION

Accordingly, it is an object of this invention to facilitate the focus adjustment of a high-performance camera.

It is a further object of this invention to facilitate the magnification adjustment of a high-performance camera.

It is still another object of this invention to provide for the rapid and concurrent adjustment of the focus and magnification of a high-performance camera.

These and other objects of our invention are achieved by adjusting the location of the object and image planes of the camera to minimize the focus and magnification errors. To do this, a special test reticle is used comprised of at least one, and preferably nine, test patterns on one side of the reticle. Over each pattern, a first prism is cemented to tilt the apparent plane of the test pattern as seen in the prism and a second prism is ordinarily cemented to the other side of the reticle to compensate for the refraction due to the first prism. In use, the test reticle is placed in the object plane of the camera lens and a test image plate is placed in the conjugate image plane. This plate is exposed and developed. The sharpest points in the image of each of the tilted portions of the test patterns as well as the spacing between certain fiducial marks are then measured. From this data is derived the corrections that should be made in the positions of the object and image planes. With six to eight iterations of this procedure, good adjustment of the camera is achieved.

BRIEF DESCRIPTION OF THE DRAWING

These and other objects, features and details of our invention will become more readily apparent from the following detailed description of the drawing in which:

FIG. 2 is a schematic representation of an illustrative embodiment of a test reticle used in the apparatus of FIG. 1;

FIG. 3 is a cross section through line 3—3 of FIG. 2; and

DETAILED DESCRIPTION OF THE DRAWING

Figure 1:
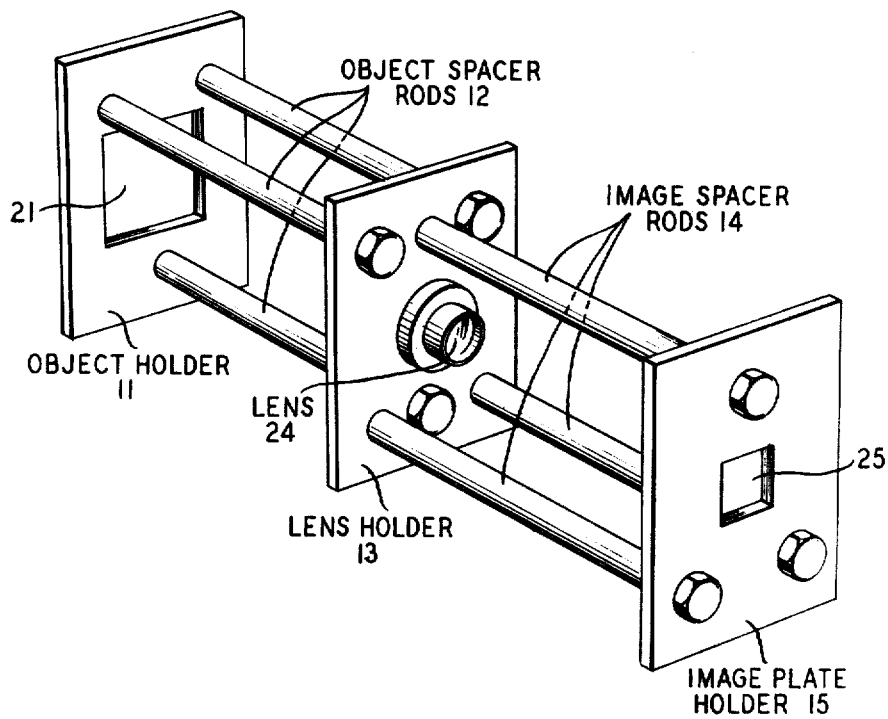
FIG. 1 is a schematic representation of an illustrative embodiment of apparatus for determining the object and image planes at which focus of magnification errors are minimized.

Illustrative apparatus for determining the object and image planes of a lens is shown in FIG. 1. This apparatus comprises mounting means 11 for locating an object in the object plane of the lens, mounting means 13 for holding the lens, and mounting means 15 for positioning a surface, such as a photographic plate, in the conjugate image plane of the lens. Typically, means 11 and 13 are spaced apart by spacer rods 12, and means 13 and 15 are spaced apart by spaced rods 14. In mounting means 11 is an aperture 21 into which the object is placed. In means 13 is a similar aperture into which a lens 24 is placed; and in means 15 is an aperture 25 into which a photographic plate is placed. When a suitable object is placed in aperture 21, the focus and magnification errors of a lens located in aperture 23 can be determined by studying the image formed on the surface located in holder 13. Adjustments can then be made in the lengths of spacer rods 12 and 14 to tilt mounting means 11 and/or 15 and to increase or decrease the separation of these means from mounting means 13. In the past this process has been extremely tedious and difficult requiring seemingly endless calculations and iterations of the alignment procedure.

To alleviate these problems, we have devised a special test reticle shown in FIGS. 2 and 3 and have developed an automated procedure for accomplishing focus and magnification adjustments in six or eight relatively rapid iterations of the alignment procedure.

An illustrative embodiment of our test reticle comprises a microflat photographic plate 31 on a first surface of which are located nine resolution test patterns and fiducial marks. Illustratively, this surface is the side facing the viewer in FIG. 2. Typically, the resolution test patterns are standard patterns of vertical and horizontal bars of different spatial frequencies and the fiducial marks are L-shaped. On the first surface of plate 31 are located nine prisms 35 that tilt the apparent lane of the test pattern underneath them. These prisms are cemented to the surface of plate 31. On the other side of plate 31 are nine identical prisms 36 that compensate for the refraction by prisms 35 of a beam that illuminates plate 31. Also shown are stand-off pads 39 that make the apparent tilted plane of the test pattern straddle the object plane of the camera.

For convenience, these same elements are shown in FIG. 3 in cross section along line 3—3 of FIG. 2. Also shown in FIG. 3 is the location of the plane 41 of the test pattern, the apparent plane 43 of the test pattern as seen in the prism, and the object plane 45.

Before using the test reticle, it must be calibrated. This is done by placing the test reticle on a movable table underneath a microscope with a shallow depth of field. The position of the reticle on this table is then adjusted until the microscope's focal plane is coincident with the offset object plane 45 defined by the top surface of the six standoff pads 39. The nine prism areas are then examined in turn, and the coordinates of the point where the bar pattern appears sharpest is recorded. These points define a plane that will be referred to below as the object plane of sharpest focus. In addition the coordinates of the nine fiducial marks are recorded.

While the recording of these coordinates and the additional recordings that will be described below could all be done by hand, it is far more preferable to make such recordings with a computer-controlled coordinate measuring machine that has recently been described in the literature. See F. R. Ashley, Miss E. B. Murphy, and H. J. Savard, Jr., "An Automated Micro Measurement System for Integrated Circuit Masks," at page 17 of the Proceedings of the SHARE-ACM-IEEE Design Automation Workshop (June 22–25, 1970, San Francisco, California). This machine is basically a Do-all coordinate measuring machine controlled by a Digital Equipment PDP-8 computer. The coordinate measuring machine comprises a microscope, a table that can be moved in a plane through the field of the microscope, and fringe counting interferometers that measure the location of the table at any time with respect to a reference point. To measure the coordinates of a set of points on the test reticle, the reticle is simply secured to the table of the machine, the table is moved until a particular point on the test reticle is aligned with a reticle in the microscope, and a record is made of the reading on the interferometers. The steps of aligning and recording are then repeated for every other point of interest on the test reticle.

By using the computer to record the data and control the operation, considerable savings in time and effort are attained. Because the general location of the various coordinates of interest is known in advance, the computer can be used to control the motion of the table from one point of interest to the general area surrounding the next point of interest. All data recording is automated, typically being done when the operator of the machine pushes a button after he has completed the final alignment between a point of interest on the test reticle and the reticle in the microscope.

After the coordinates of the points of sharpest focus and the locations of the fiducial marks on the test reticle are recorded, the calibration of the test reticle is complete and need never be repeated.

The test reticle is then used in the apparatus of FIG. 1 to align the object and conjugate image planes of a lens so that focus and magnification errors are minimized. First, the test reticle is placed in mounting means 11 and the lens is positioned in lens holder 13. Mounting means 11 and 15 are then spaced apart from lens holder 13 approximately the distances required to give the intended magnification of the lens; and the mounting means are adjusted so that an image of each test pattern in the test reticle intersects the plane in which mounting means 15 is located. After this preliminary alignment, a test image plate is located in mounting means 15 in such a position that the image of each test pattern intersects the plane of the test image plate. Ordinarily, the test image plate is a photographic plate.

Radiation is then directed through the test reticle and is imaged by the lens onto the test image plate. As a result, each of the nine test patterns on the test reticle is imaged about the image plane of the lens. Because each of the test patterns was tilted by a prism and therefore intersected the object plane of the lens, each of the images is also tilted and intersects the image plane of the lens.

After exposure, the image plate is removed from holder 15 and developed. The image plate is then secured to the table of the coordinate measuring machine, and the nine images corresponding to the nine prism areas on the test reticle are examined in turn. For each image, a record is made of the coordinates of the image of the fiducial mark and the coordinates of the sharpest point in the image of the bar pattern. These coordinates lie in a plane that will be referred to below as the image test plane.

When the product of the intended magnification of the lens and the distance in the image test plane from each point of sharpest focus to the nearest fiducial mark is equal to the distance in the object plane from the corresponding point of sharpest focus to the corresponding fiducial mark, the image test plane coincides with the conjugate image of the object plane of sharpest focus; and the focus error is eliminated. Initially, however, because the object and image planes will not be properly aligned, a difference will be observed between the product of magnification and distance in the image test plane from each point of sharpest focus to the nearest fiducial mark and the corresponding measurement in the object plane. In this case, the location of the conjugate image of the object plane of sharpest focus can readily be determined from this difference taking into account the magnification of the lens and the tilt of the test pattern. As a result, a focus error map can be made setting forth for each of the nine images the distance in a direction parallel to the optical axis from the location of the image on the image test plane to the location of the conjugate image of the object plane of sharpest focus.

Figure 4:
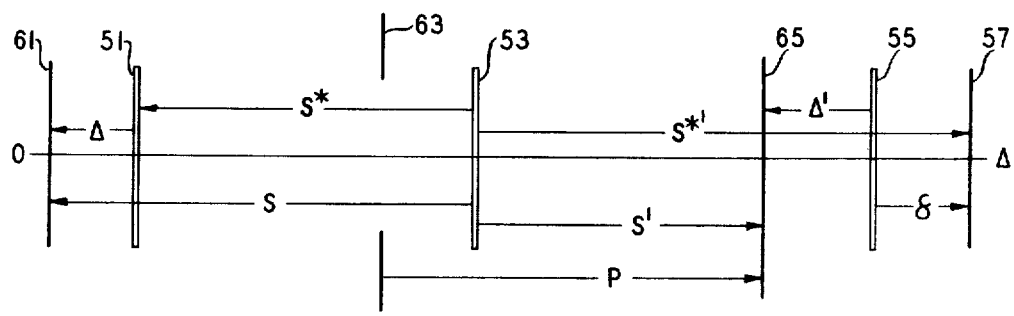
FIG. 4 illustrates the relationship between various planes in the apparatus of FIG. 1.

The nine distances enumerated on the focus error map are sufficient to specify the location of the conjugate image plane of the object plane of sharpest focus. The relation between the object plane, the lens, the test image plane, and the image of the object plane is illustrated by FIG. 4. The optical axis of the system is OA. The object plane is shown at 51, the lens at 53, the image test plane at 55, the image of the object plane at 57. The remainder of FIG. 4 will be discussed below.

A similar error map can be generated for magnification errors. In this case, the twelve distances between adjacent fiducial marks on the image test plate are compared with the twelve distances between adjacent fiducial marks on the test reticle. After allowing for the intended magnification of the lens, a magnification error map can be made setting forth the departures of the observed magnification from the ideal for each of the twelve distances. These magnification errors are assumed to be the errors halfway between each pair of adjacent fiducial marks. To obtain the magnification errors at the nine fiducial marks, the magnification error is assumed to be linear and the twelve magnification errors are extrapolated and interpolated by standard methods to give the errors at the fiducial marks. As a result independent magnification errors and focus errors are determined for each of the nine test patterns.

For each of the nine test patterns, the necessary changes in the object distance and image distance are then calculated to correct for both the magnification and focus errors. The nature of these calculations is best explained with reference to FIG. 4. In addition to showing the location of the test reticle, the lens, the test image plate and the image of the test reticle, this figure also shows at 61 the corrected location for the object plane and at 65 the corrected location for the image plane. The exit pupil of lens 53 is shown at 63. Because the output of these calculations is a set of prescribed changes in the location of the object and image planes and not the actual location of these planes, it is satisfactory to assume that the lens is a thin lens and that paraxial approximations are sufficiently accurate. Thus, the separation between the principal point of the lens is assumed to be zero.

The distance between the object pane 51 and the lens is $s^*$; and the distance between the image plane 57 of this object and the lens is $s^{*'}$. The distance between image plane 57 and the location of the image plate in plane 55, which is the focus error, is $\delta$. The distance between the corrected object plane 61 and the lens is $s$; and the distance between the corrected image plane 65 and the lens is $s'$. The distance between object plane 51 and corrected object plane 61 is $\Delta$; and the distance between image plane 55 and corrected image plane 65 is $\Delta'$. The distance between exit pupil 63 and corrected image plane 65 is $p$.

To calculate the desired corrections in the location of the object and the image planes at each of the nine test areas, five equations are used. Two of these are the thin lens equation $$\frac{1}{s'} - \frac{1}{s} = \frac{1}{f} \quad (1)$$

$$\frac{1}{s^{*'}} - \frac{1}{s^*} = \frac{1}{f} \quad (2)$$

where $f$ is the focal length of the lens. Two more are magnification relations $$\frac{s'}{s} = m \quad (3)$$

$$\frac{s^{*'}}{s^*} = m^* \quad (4)$$

where $m$ is the intended magnification of the lens and $m^*$ is the magnification that would be observed in plane 57. The last equation relates $m^*$ to the magnification $m^{**}$ that is observed in plane 55 by $$m^* = m^{**} \left( \frac{p - \Delta' + \delta}{p - \Delta'} \right) \quad (5)$$

where $(p-\Delta')$ is the distance from plane 63 to plane 55 and $p$ is obtained from the design parameters of the lens. This relation is based on the fact that the chief ray from any off-axis point crosses the axis at the exit pupil. From the preceding description of the magnification error, it will be apparent that the magnification error is equal to $m^* - m^{**}$. Equation (5) can be simplified by the approximation that $p >> \Delta'$ whereupon $$m^* = m^{**}\left(\frac{p+\delta}{p}\right) \qquad (6)$$

The resulting five equations are then solved for the five unknowns $s$, $s'$, $s^*$, $s^{*'}$, and $m^*$ as functions of the constant parameters $f$, and $p$ of the lens and the desired magnification $m$ and the measured focus error $\delta$ and measured magnification $m^{**}$. The distance the object plane should be shifted is then calculated from $$\Delta = s - s^* \qquad (7)$$

and the distance the image plane should be shifted is calculated from $$\Delta' = s' - (s^{*'} - \delta). \qquad (8)$$

These calculations are performed for each of the nine test patterns with the result that nine corrective shifts are determined for the object plane and nine more for the image plane.

The nine object plane shifts are then averaged using a least squares approximation to find the tilted and displaced plane that best fits the nine individual shifts. The same is done for the nine image plane shifts. Finally, the changes in length of the six spacer rods are calculated.

The changes in length of the spacer rods are then made, and a new test image plate is inserted into aperture 25. An exposure is made, the image plate is developed and measured, and a new set of corrections are determined. This procedure is repeated until the locations of the object and image planes of the lens are determined within the desired accuracy.

In practicing our invention, we have been able to align the object and image planes to the accuracy we desire with six to eight iterations of the above procedure. Typical accuracies that were attained were focus errors that at worst were 9.4 microns and averaged 4.1 microns and magnification errors that at worst were 0.37 parts in 10,000 and averaged 0.20 parts in 10,000.

In attaining these accuracies, we also found it desirable to correct for a small systematic error introduced into the magnification measurement because the lens looks obliquely through most of the prisms at the fiducial marks while the calibration measurements are all made while viewing the prisms normally. This error can be accurately measured by carefully comparing the magnification of the camera as measured by the test reticle with the magnification as measured by a similar test reticle that has no prisms and no stand-offs. The difference in magnification, which is about one part in 10,000, can then be allowed for in computing the magnification error; and the systematic error can thereby be eliminated.

As will be obvious to those skilled in the art, it is not necessary that the test reticle contain nine test patterns. With less accuracy, fewer patterns could be used; and one would be able to get by with only one pattern if a single on-axis measurement was enough for one's alignment requirements. To align planes, as few as three patterns will suffice provided they are not all in the same straight line. With more than nine patterns, somewhat greater accuracy may be achieved; but the added expense in computer time and measurement time probably makes the use of more patterns unwarranted.

The particular details of the test apparatus we have shown are only illustrative and other arrangements will be obvious to those skilled in the art. For example, the second set of prisms 36 need not be used if the illuminating beam is diffuse. Similarly, the calculation procedures have equivalents that will be obvious to those skilled in the art.

What is claimed is:

1. A test reticle for use in aligning an object plane and the corresponding conjugate image plane of a lens in order to minimize focus and magnification errors comprising:
   a transparent medium having a first and second surface;
   at least one test pattern and one fiducial mark disposed on the first surface; and
   a prism mounted on the first surface of the transparent medium over each test pattern.

2. The test reticle of claim 1 wherein there are at least three noncollinear test patterns disposed on the first surface and at least three noncollinear fiducial marks disposed on the first surface.

3. The test reticle of claim 2 wherein there are nine test patterns and nine fiducial marks disposed on the first surface in a three-by-three matrix.

4. The test reticle of claim 1 further comprising a prism mounted on the second surface of the transparent medium behind each prism mounted on the first surface.

5. The test reticle of claim 1 wherein each prism mounted on the first surface of the transparent medium covers both a test pattern and a fiducial mark.

6. A method of aligning for best focus and desired magnification an object plane and the corresponding conjugate image plane of a camera comprising the steps of:
   determining to a first approximation the location of the object plane and the corresponding conjugate image plane;
   positioning at the approximate location of the object plane both at least one substantially planar test pattern that, as seen from the lens of the camera, intersects the object plane at a non-zero angle and at least one fiducial mark;
   positioning at the approximate location of the conjugate image plane an image test surface;
   forming an image of the test pattern and fiducial mark on the image test surface;
   detecting and calculating focus and magnification errors of the camera from an image formed on the image test surface;
   deriving from the above calculated errors the location of the object plane and the location of the corresponding image plane;
   repositioning at the derived location of the object plane both at least one substantially planar test pattern that, as seen from the lens, intersects the derived object plane at a non-zero angle and at least one fiducial mark; and
   repositioning at the derived location of the image plane an image test surface.

7. The method of claim 6 further comprising the step of:
   repeating the steps of claim 6 of forming, detecting, deriving, and repositioning in order to align the object plane and the corresponding conjugate image plane of the camera in order to correct for any errors due to inaccurate original repositioning at the derived locations of the object and image planes.

8. A test reticle for use in aligning an object plane and the corresponding conjugate image plane of a lens in order to minimize focus and magnification errors comprising:
   a transparent medium having a first and second surface;
   at least one test pattern disposed on the first surface; and
   a prism mounted on the first surface of the transparent medium over each test pattern.

9. A method for determining focus and magnification errors of a camera comprising the steps of:
   determining to a first approximation the location of the object plane and the corresponding conjugate image plane;
   positioning at the approximate location of the object plane both at least one substantially planar test pattern that, as seen from the lens of the camera, intersects the object plane at a non-zero angle and at least one fiducial mark;
   positioning at the approximate location of the conjugate image plane an image test surface;
   forming an image of the test pattern and fiducial mark on the image test surface; and
   detecting and calculating focus and magnification errors of the camera from an image formed on the image test surface.

* * * * *